Figure 1:
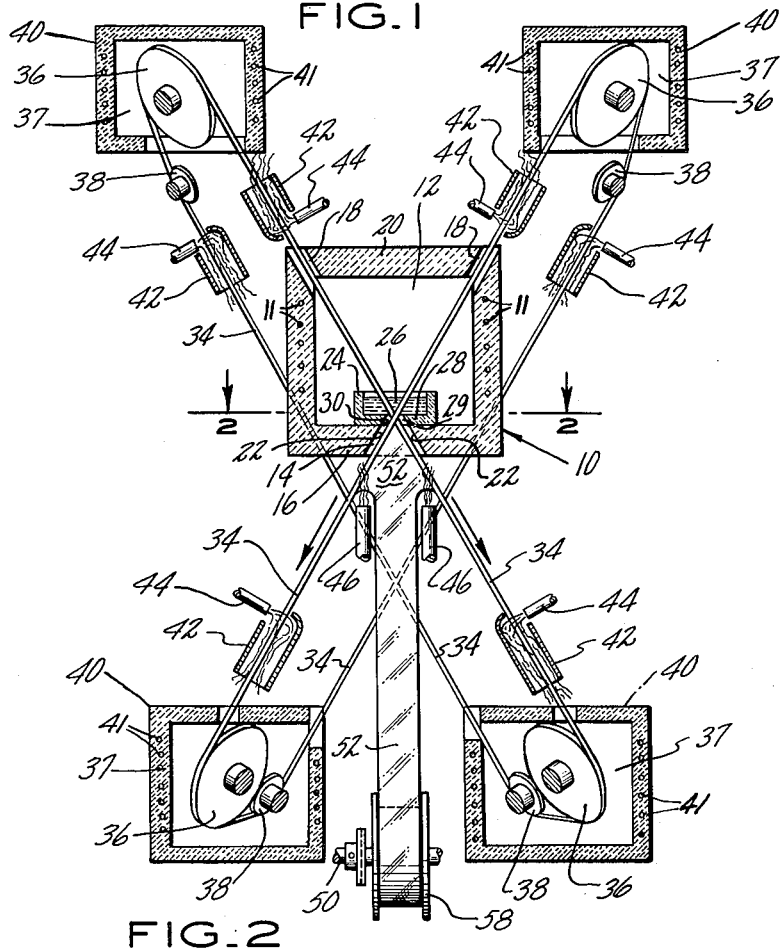

June 6, 1961 S. A. LOUKOMSKY 2,986,843
APPARATUS FOR FORMING A GLASS FILM
Filed May 14, 1959

INVENTOR
SERGE A. LOUKOMSKY
BY *Teller & McCormick*
ATTORNEYS

United States Patent Office 2,986,843
Patented June 6, 1961

2,986,843
APPARATUS FOR FORMING A GLASS FILM
Serge A. Loukomsky, Hartford, Conn., assignor to Emhart Manufacturing Company, Hartford, Conn., a corporation of Delaware
Filed May 14, 1959, Ser. No. 813,192
5 Claims. (Cl. 49—17)

The invention relates to glass forming apparatus and more particularly to methods and apparatus for forming a thin glass film.

The general object of the invention is to provide a method and apparatus for continuously forming a thin glass film suitable for use as a flake or sheet laminate. More particularly, the object of the invention is to provide a novel method and apparatus for producing glass film suitable for use as a flake or sheet laminate and having advantageous mechanical properties over currently available commercial laminates or mechanical properties equal to commercially available laminates combined with an economic advantage.

In brief, the invention comprises a process in which molten glass is deposited upon a pair of movable endless carriers positioned closely adjacent each other. Thereafter, each of the carriers is moved in a direction divergent from that of the other of said carriers so as to stretch the glass into a thin film between the diverging carriers. After the film has reached its proper condition, and prior to rupture of the film, it is removed from the carriers and either rolled into a continuous sheet or broken into discrete flakes.

A preferred apparatus for carrying out the above-described method comprises, in general, a container to serve as a reservoir for the molten glass and provided with an opening through which a pair of movable endless carriers are passed. Means are provided for supporting the carriers and for moving the same in diverging directions upon emerging from the opening in the reservoir container so as to stretch the molten glass on the carriers into a thin film between the carriers. Suitable means are provided for removing the film from the carriers before it is ruptured by their increasing divergence.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 2:
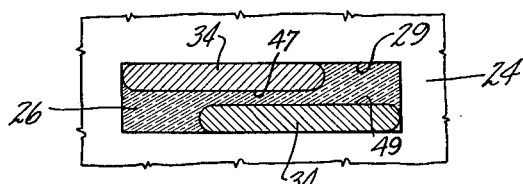
Figure 3:
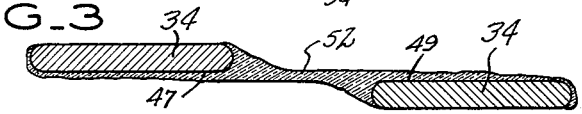
Figure 4:
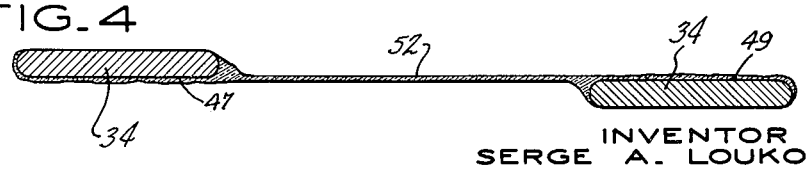

Of the drawings:

FIG. 1 is a schematic view of a preferred apparatus for carrying out applicant's novel method in which the pulley and wire carrier structure has been turned sidewise for the sake of clarity, said structure being normally disposed in planes perpendicular to the plane of the drawing, FIG. 2 is a sectional view taken along the line 2—2 in FIG. 1 looking in the direction of the arrows, FIG. 3 is a transverse sectional view showing the initial stretching of the film upon the divergence of the carriers, and FIG. 4 is a transverse sectional view similar to that of FIG. 3 showing further stretching of the film by the diverging carriers.

Applicant's method broadly comprises the steps of depositing molten glass on a pair of movable endless carriers positioned closely adjacent to each other, moving each of said carriers in a direction divergent from that of the other of said pair of carriers so as to stretch the molten glass into a very thin film between the diverging carriers, and removing the film from the carriers prior to rupture thereof. More specifically, the method comprises moving a pair of carriers in separate intercepting planes to provide at least one point at which the two carriers are closely adjacent and depositing molten glass on the carriers at that point so that further movement of the carriers, by reason of their divergence, will stretch the glass into a film.

In preferred form the method comprises the passing of a pair of wire members through a reservoir of molten glass to pick up a quantity of glass and then causing the members to laterally diverge from each other to stretch the glass into a thin film therebetween. The production of a film is facilitated by heating the carriers throughout the entire cycle of movement, especially just prior to the entrance of the carriers into the molten glass.

Apparatus for carrying out the preferred method described above will now be described with reference to the drawing in which a preferred embodiment of the apparatus is shown.

In general, the apparatus comprises means for providing a zone of very high temperature in which glass may be continuously kept in a molten plastic condition and means for passing movable carriers through the molten glass and causing them to diverge laterally to stretch the glass into a thin film.

A furnace 10 is provided with suitable heating means, such as electrical heating elements 11, 11, whereby the internal chamber 12 may be continuously maintained at a temperature high enough to melt glass. Two openings 18 in the upper wall 20 and one opening 14 in the bottom wall 16 of the furnace provide access to the internal chamber 12. The openings 18 are oppositely inclined on axes that intersect adjacent the opening 14 and this latter opening has outwardly flared sides 22, 22.

Situated in the furnace immediately above the opening 14 is a container 24 of suitable refractory material which serves as a reservoir for a supply of molten glass 26. The bottom wall 28 of the container 24 has an opening 29 shaped with flared sides 30, 30 corresponding to the flared sides 22, 22 of the opening 14 so as to form therewith an outwardly increasing orifice having diverging side walls.

As shown, the movable carriers take the form of a pair of endless flattened wire members 34 mounted for movement around a pair of pulleys 36, 36. Two of the pulleys have suitable driving means (not shown) which move the carriers at equal speed. Between the pairs of pulleys 36, 36 the carriers 34, 34 pass through an access opening 18 in the top of the furnace 10. In order to direct the wire members through the molten glass 26 in the reservoir 24, the upper and lower pulleys 36, 36 for each pair of wire members 34, 34 are positioned in a plane of movement that is inclined to a vertical axis. However, this inclination is not essential to the invention and the invention is not so limited, it being only necessary that the wire members be moved in planes of motion which cause the carriers 34, 34 to pass closely adjacent to each other at a peripheral point. From the reservoir 24 the wire memebrs 34, 34 pass through the openings 29 and 14 and then diverge outwardly.

For the purpose of maintaining the wire members under proper tension as they pass through the furnace, the pulleys 36, 36 are each provided with a take-up wheel 38, 38 adjacent thereto. The take-up wheels 38, 38 are movable toward and away from the pulleys 36 and serve to take up the slack in the flattened wire members 34 occasioned by the heating and consequent expansion thereof. In order to keep the wire members passing through the furnace and the molten glass at a proper temperature, each of the pulleys 36 is positioned within a heated chamber 37 in a housing 40 having electrical heating elements 41, 41 in its walls. Additionally, preheating tubes 42, 42 are positioned between the furnace 10 and the pulleys 36, 36 and are each provided with suitable burners 44, 44 so as to heat the wire members as they pass therethrough. Thus, in this manner, the glass remaining on the wire members is continually reheated and reworked.

In operation, the wire members pass through the molten glass in the reservoir 24 and pass closely adjacent to each other at the orifice 29. As they do so, molten glass is deposited on the members 34. As the wires 34 pass through the bottom of the reservoir 24 and out of the furnace 10, the diverging movement of the wire members stretches the glass deposited thereon into a very thin sheet of film 52.

The action of the diverging wire members 34 upon the molten glass is best shown in FIGS. 2–4. In FIG. 2 the flattened wire members 34 are shown in their positions as they pass through the orifice 29 in the bottom of the reservoir 24. It will be noted that the wire members are substantially parallelly disposed and are spaced from each other a slight distance. Adjacent flat surfaces 47 and 49 on the wires are parallel but spaced apart and molten glass is deposited between and on said surfaces and adheres thereto. As the wires 34 emerge from the opening in the bottom of the reservoir and pass downwardly through the furnace, the wire members tend to diverge, that is, move in a lateral direction with respect to each other. This lateral movement of the flattened wire members, due to the surface tension of the molten liquid, results in a stretching of the molten glass therebetween into a thin film 52. Stretching of the film takes place in a direction generally parallel with the surfaces 47 and 49 of the wires as will be seen in FIGS. 2, 3 and 4. As the wires continue to diverge, the film 52 becomes thinner and thinner until it finally reaches a thickness of approximately .001 to .0001 inch.

Before the film ruptures, the cutoff burners 46 heat the opposite edges of the glass film on the wire members 34 sufficiently to enable the film to be removed therefrom. As the film 52 leaves the wire members 34, its width is substantially reduced. In the embodiment of the invention shown in the drawing, the film is continuously wound onto a drum 58 mounted on the shaft 50, but the film could well be broken into discrete flakes by any suitable mechanism, as, for instance, a paddle wheel or the like.

The invention claimed is:

1. Apparatus for making glass film comprising a container for molten glass having an opening therein, a pair of endless carriers extending through said opening in adjacent relationship and extending outwardly therefrom in diverging directions, and means for supporting said carriers and for moving the same in the direction of their divergence whereby said carriers draw molten glass from said opening and progressively stretch the same into a thin film therebetween.

2. Apparatus for making glass film as set forth in claim 1 and including means for heating said carriers externally of said molten glass container.

3. An apparatus as set forth in claim 1 and including heating means for removing film from the carriers prior to rupture thereof.

4. An apparatus as set forth in claim 1 in which the carriers take the form of thin wire members.

5. An apparatus for making glass film as set forth in claim 4 wherein said means for supporting and moving said wire members comprises a pair of support pulleys for each of said members, and wherein at least one pulley of each pair of pulleys is power operated to drive its corresponding wire member in the direction of divergence of said wire members.

References Cited in the file of this patent

UNITED STATES PATENTS

| 2,276,615 | Hazelett | Mar. 17, 1942 |
| 2,342,891 | Powers | Feb. 29, 1944 |

FOREIGN PATENTS

| 169,136 | Great Britain | Oct. 20, 1921 |